United States Patent
Carney et al.

(10) Patent No.: US 8,542,381 B2
(45) Date of Patent: Sep. 24, 2013

(54) PURGING OF PRINT JOBS FROM A PRINT DATA PATH

(75) Inventors: Dennis M. Carney, Louisville, CO (US); Allan A. Hren, Longmont, CO (US); Charles D. Johnson, Boulder, CO (US); Lisa A. Morgan, Longmont, CO (US)

(73) Assignee: Ricoh Production Print Solutions LLC, Boulder, CO (US)

( * ) Notice: Subject to any disclaimer, the term of this patent is extended or adjusted under 35 U.S.C. 154(b) by 1442 days.

(21) Appl. No.: 12/043,106

(22) Filed: Mar. 5, 2008

(65) Prior Publication Data
US 2009/0225347 A1  Sep. 10, 2009

(51) Int. Cl.
*G06F 3/12* (2006.01)
(52) U.S. Cl.
USPC .................................. 358/1.15; 358/1.16
(58) Field of Classification Search
USPC .................. 358/1.1, 1.2, 1.14, 1.15, 1.16
See application file for complete search history.

(56) References Cited

U.S. PATENT DOCUMENTS

| | | | |
|---|---|---|---|
| 6,282,636 B1 | 8/2001 | Yeh et al. | |
| 6,598,156 B1 | 7/2003 | Arora | |
| 6,728,865 B1 | 4/2004 | Coon et al. | |
| 2007/0182980 A1* | 8/2007 | Carney et al. | 358/1.14 |
| 2007/0198814 A1 | 8/2007 | Abernathy et al. | |

* cited by examiner

*Primary Examiner* — Benny Q Tieu
*Assistant Examiner* — Michael Y Tzeng
(74) *Attorney, Agent, or Firm* — Duft Bornsen & Fettig, LLP (57) ABSTRACT

A print controller and associated methods of purging a print data path are disclosed. A print controller comprises a job storage system that receives and stores print jobs, and a print data path, which includes components operable to process print jobs, from the job storage system to print engines. The control system receives registrations from the components for flush job messages, flush path messages, or both. The control system receives a request to purge the print data path, and identifies print jobs being processed in the print data path. The control system transmits flush job messages to the components registering for the flush job messages for each print job instructing the components to purge data for the print jobs. The control system also transmits a flush path message to the components registering for the flush path messages instructing the components to purge data for the print jobs being handled.

26 Claims, 8 Drawing Sheets

PURGING OF PRINT JOBS FROM A PRINT DATA PATH

BACKGROUND OF THE INVENTION

1. Field of the Invention

The invention relates to the field of production printing systems and, in particular, to purging print jobs from a print data path in a print controller through a flush job message and/or a flush path message.

2. Statement of the Problem

Production printing systems associated with data processing enterprises generally include a localized print controller within the printing system. The print controller controls the overall operation of the printing system including, for example, host interfacing, interpretation or rendering, and lower level process control or interface features of print engines of the printing system. Host interfacing may include appropriate adapters for coupling the printing system to one or more host systems that transmit print jobs to the printing system. The print jobs are generally encoded in the form of a page description language such as PostScript (PS), PCL, IPDS, etc.

In whatever form the print job may be encoded or formatted, the print controller within the printing system receives the print jobs and stores the print jobs in a job spool or some other job storage system. The print controller includes a print data path from the job storage system to one or more print engines (also referred to as an "imaging engine" or as a "marking engine"). The print data path includes components that process the print jobs. For instance, one of the components interprets or renders the received information to generate sheet-side bitmaps of the print job. The sheetside bitmaps represent the image to be printed on one side of a sheet of paper.

The components in the print data path also store or buffer the sheetside bitmaps in accordance with storage capabilities of the particular architecture of a print controller. The print controller then forwards the sheetside bitmaps to the print engines. The print engines have internal queues for storing the sheetside bitmaps to be printed. A print engine pulls the sheetside bitmaps off of the queue, and performs an imaging process to mark the printable medium (e.g., a sheet of paper) with the sheetside bitmaps provided by the print controller. The print engine may comprise a laser print engine, an ink-jet print engine, or another type of imaging system that transfers each sheetside bitmap to corresponding pixels on paper.

In high-speed production printers, in order to provide the print engine with sufficient pages to maintain rated-speed printing, the print data path through the print controller needs to be able to contain a lot of print job data and to be kept as full as possible. Otherwise, delays in one component can cause the part of the print data path feeding the print engine to run empty. There may be instances during the printing process when the print data path needs to be purged of the print jobs being presently processed. For instance, if print settings are changed that affect the print jobs being processed, then the print data path may need to be purged because the data being processed, such as the sheetside bitmaps, would no longer be correct.

One solution to the problem is to stop putting new data into the print data path, and let the printing process continue to empty out the old data. This works well when the amount of data in the print data path is small. However, this solution may not be desirable if the amount of data in the print data path is large, as the print engine may run for several minutes in order to empty the print data path.

Because present solutions may not be adequate, more effective ways of purging a print data path may be desired.

SUMMARY OF THE INVENTION

Embodiments of the present invention solve the above and other related problems with an improved way of purging a print data path in a print controller. The print controller purges the data using a flush job message and/or a flush path message as requested by the components in the print data path. Responsive to receipt of a flush job message, a component purges data regarding a specified print job. Responsive to receipt of a flush path message, a component purges data for each of the print jobs being handled. The use of flush job messages and flush path messages effectively and efficiently purges data from the print data path. Also, purging is initiated and performed in the print controller and not in a host system. Thus, a host system providing print jobs to the print controller does not need to be continually connected to the print controller in order to purge the print data path.

One embodiment of the invention comprises a print controller for a production printing system. The print controller comprises a job storage system operable to receive print jobs from one or more host systems, and to store the print jobs. The print controller further comprises a print data path from the job storage system to one or more print engines of the production printing system. The print data path includes one or more components operable to process print jobs for imaging on the print engine, where each component includes buffers or work queues used in processing print jobs.

The print controller further comprises a control system operable to purge print jobs from the print data path. Before purging occurs, the control system receives registrations from the components in the print data path for flush job messages, flush path messages, or both. The control system then receives a request to purge the print data path. The request may be in response to detecting a redrive event, such as a change to print settings or a hardware error. Responsive to the request, the control system identifies the print jobs being processed in the print data path. The control system then transmits flush job messages to the components registering for the flush job messages for each of the identified print jobs in the print data path. The flush job messages instruct the components to purge data for the identified print jobs. The control system also transmits a flush path message to the components registering for the flush path messages. The flush path messages instruct the components to purge data for the print jobs being handled by the component (i.e., all of the print job data is purged).

The components that receive a flush job message identify a print job indicated in the flush job message, and purge data for the identified print job from internal memories or processes. The components that receive a flush path message purge data for the print jobs being handled from internal memories or processes. Some of the components may register and receive both flush job messages and a flush path message.

After transmitting the flush job messages and the flush path messages, the control system transmits a flush token over the print data path. The component at the end of the print data path transmits a flush complete message to the control system responsive to receiving the flush token over the print data path. After transmitting the flush token, the control system waits for the flush complete message from the component at the end of the print data path. When the control system receives the flush complete message, this indicates that the purging of the print data path is complete.

DESCRIPTION OF THE DRAWINGS

The same reference number represents the same element or same type of element on all drawings.

DETAILED DESCRIPTION

FIGS. 1-8 and the following description depict specific exemplary embodiments of the present invention to teach those skilled in the art how to make and use the invention. For the purpose of this teaching, some conventional aspects of the invention have been simplified or omitted. Those skilled in the art will appreciate variations from these embodiments that fall within the scope of the present invention. Those skilled in the art will appreciate that the features described below can be combined in various ways to form multiple variations of the present invention. As a result, the invention is not limited to the specific embodiments described below, but only by the claims and their equivalents.

Figure 1:
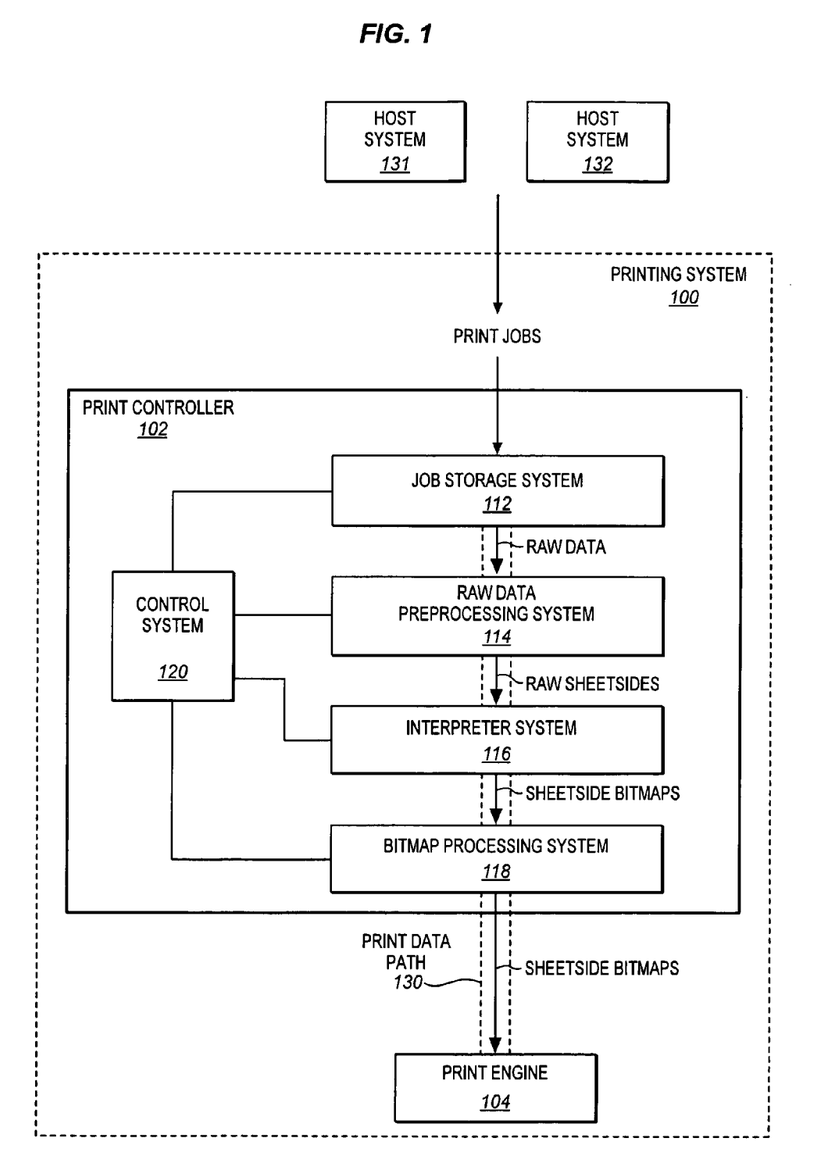
FIG. 1 illustrates a printing system in an exemplary embodiment of the invention.

FIG. 1 illustrates a printing system 100 in an exemplary embodiment of the invention. Printing system 100 comprises any system used to provide marks on media, such as a continuous forms printer or a cut sheet page printer. In this embodiment, printing system 100 comprises a production printing system, which is a high-speed printer used for volume printing, such as 100 pages per minute or more. Printing system 100 includes a print controller 102 and one or more print engines 104. Print controller 102 comprises any system, server, or components operable to interface one or more host systems with one or more print engines, and to control the printing of print jobs received from the host systems on the print engines. Print controller 102 in this embodiment is a production print controller used for a production printing system. A production print controller is capable of concurrent page or sheetside rendering, meaning that an interpreter system in the print controller is operable to render multiple pages or sheetsides concurrently. Print engine 104 comprises any system operable to provide an imaging process to mark a printable medium. Printing system 100 may include other components or systems not shown for the sake of brevity.

Print controller 102, in its generalized form, includes a job storage system 112, a raw data preprocessing system 114, an interpreter system 116, and a bitmap processing system 118. Job storage system 112 comprises any system, server, or component operable to receive print jobs from one or more host systems 131-132, and store the print jobs for printing on the print engine 104, such as in a raw job spool (not shown). Raw data preprocessing system 114 comprises any system, server, or component operable to receive raw data for print jobs, and perform preprocessing on the raw data before the print jobs are interpreted, such as to segment the print jobs into pages, and assemble the pages into sheetsides. Interpreter system 116 comprises any system, server, or component operable to interpret, render, rasterize, or otherwise convert raw sheetsides for print jobs into sheetside bitmaps for the print jobs. Interpreter system 116 is operable to interpret or render multiple raw sheetsides concurrently so that the rate of rendering substantially matches the rate of imaging of production print engines. Bitmap processing system 118 comprises any system, server, or component operable to store sheetside bitmaps for subsequent printing.

Print controller 102 includes a print data path 130 from job storage system 112 to print engine 104. Print data path 130 includes one or more components (i.e., processes, queues, buffers, etc) that are operable to process print jobs for imaging on print engine 104. For example, print data path 130 includes the components in raw data preprocessing system 114, interpreter system 116, and bitmap processing system 118. Print data path 130 also includes internal queues or memory within print engine 104 that is used to store sheetside bitmaps, even though these internal queues are not in print controller 102. Because these internal queues are controllable by print controller 102 and are in the data path between job storage system 112 and the actual imaging process, these internal queues are considered part of the print data path 130.

Print controller 102 also includes a control system 120. Control system 120 comprises any system, server, or component operable to purge the print data path 130. Control system 120 may purge print data path 130 for a variety of reasons. One particular reason may be responsive to a redrive event. A redrive event as provided herein comprises any event which causes preprocessing work to create output bitmaps or the completed, but not yet printed bitmaps, to no longer be correct for the present print engine configuration. One example of a redrive event comprises a change to one or more print settings being used in the printing process. For example, the changes to the print settings may include a change to width or length of a sheet, a change to special marks, a change to the sequence or placement of pages on a sheetside, a change to color management, etc. Furthermore, a redrive event also comprises an event, such as a hardware error or paper path error (e.g., a paper jam, a paper tear, etc) that requires bitmaps that were previously built, printed, and then discarded to be regenerated.

Print controller 102 as shown in FIG. 1 is comprised of separate components. These separate components may represent hardware used to implement print controller 102. One or more of the separate components may also represent logical blocks implemented in a processor executing instructions.

Figure 2:
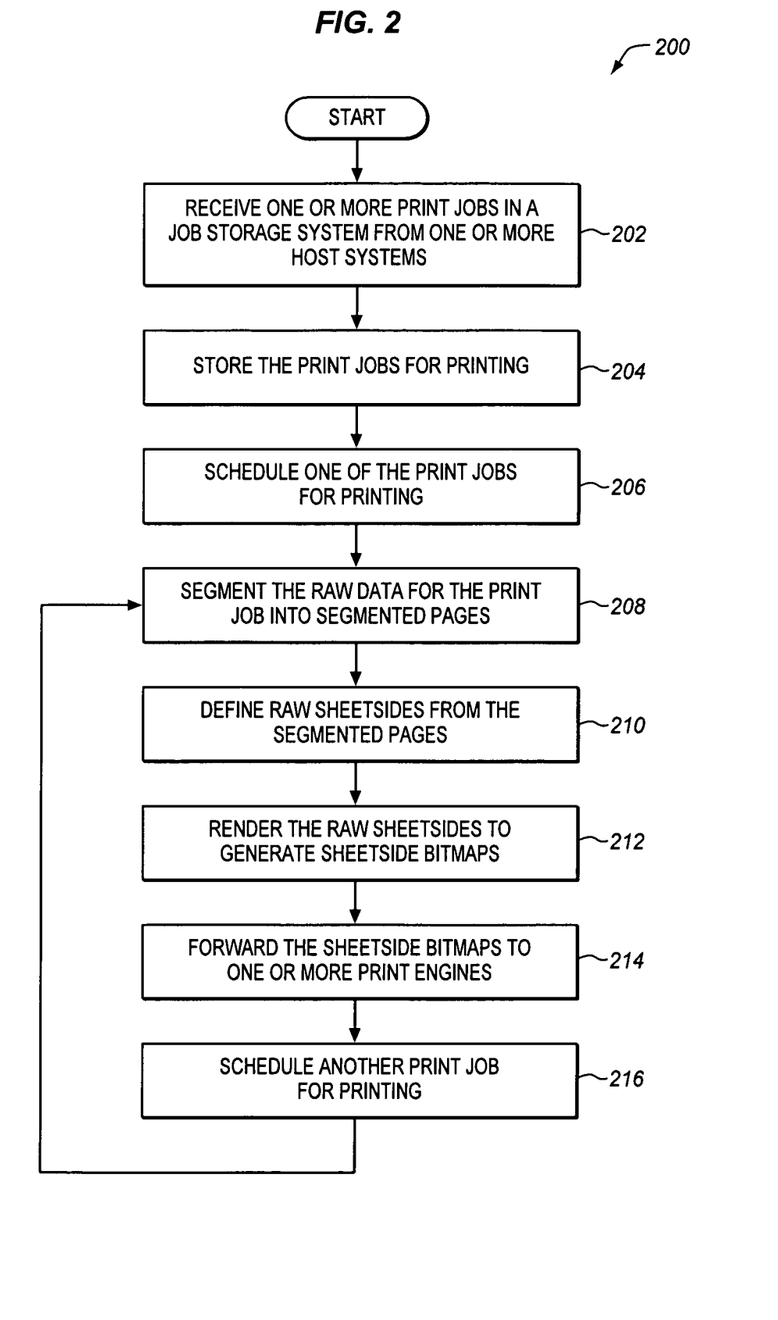
FIG. 2 is a flow chart illustrating a method of processing print jobs in a print controller in an exemplary embodiment of the invention.

The following description regarding FIG. 2 discusses processing of print jobs within print controller 102. FIG. 2 is a flow chart illustrating a method 200 of processing print jobs in a print controller in an exemplary embodiment of the invention. The steps of method 200 will be described with reference to print controller 102 in FIG. 1, although method 200 may be performed by other print controllers. The steps of the flow chart in FIG. 2 are not all inclusive and may include other steps not shown.

In step 202, job storage system 112 receives one or more print jobs from host systems 131-132, and/or from other host systems not shown in FIG. 1. The print jobs received are ASCII print data language (PDL) print jobs, such as PostScript (PS) jobs, PDF jobs, PCL jobs, PJL jobs, or PPML jobs.

In step 204, job storage system 112 stores the print jobs for printing. The print jobs stored in job storage system 112 are scheduled for printing, and are output from job storage system 112 in the scheduled order. When a particular print job or multiple jobs are scheduled in step 206, job storage system 112 forwards the raw data for the scheduled print job to raw data preprocessing system 114.

Raw data preprocessing system 114 receives raw data for the print job from job storage system 112. In step 208, raw data preprocessing system 114 segments the raw data into segmented pages for the print job. To segment the pages, raw data preprocessing system 114 may process the raw data of the print job to identify a start-of-page identifier and an end-of-page identifier for a first page of the print job, then identify a start-of-page identifier and an end-of-page identifier for a second page of the print job, etc. In step 210, raw data preprocessing system 114 defines raw sheetsides from the segmented pages. To define the sheetsides, raw data preprocessing system 114 may sequence the segmented pages in the appropriate order for the print job, may assemble the segmented pages onto the appropriate sides (e.g., front side or back side), may lay out multiple segmented pages on a sheetside (e.g., n-up), or perform other layout functionalities to define how the segmented pages are arranged or laid out onto sheetsides. Raw data preprocessing system 114 then forwards the raw sheetsides of the print job to interpreter system 116.

Interpreter system 116 receives the raw sheetsides from raw data preprocessing system 114. In step 212, interpreter system 116 renders the raw sheetsides to generate sheetside bitmaps from the raw sheetsides. The rendering process performed by interpreter system 116 to generate the sheetside bitmaps may alternatively be referred to as ripping, rasterizing, etc. Interpreter system 116 then forwards the sheetside bitmaps to bitmap processing system 118.

Bitmap processing system 118 receives the sheetside bitmaps from interpreter system 116, and stores the sheetside bitmaps. In step 214, bitmap processing system 118 forwards the sheetside bitmaps to print engine 104 (or other print engines not shown in FIG. 1).

Print engine 104 receives the sheetside bitmaps from bitmap processing system 118, and stores the sheetside bitmaps in internal queues. Print engine 104 then performs an imaging process to mark a printable medium (e.g., paper) with the sheetside bitmaps provided by print controller 102.

Depending on the processing capabilities of print controller 102 and the size of the print jobs, another print job may be scheduled in step 216. Job storage system 112 then forwards raw data for the next print job over print data path 130 to raw data preprocessing system 114, and processing continues for the next print job at step 208. Raw data preprocessing system 114 may process the next print job while interpreter system 116 or bitmap processing system 118 are processing the prior print job. Thus, there may be multiple print jobs in print data path 130 that are being simultaneously processed within print controller 102.

At some point during processing of one or more print jobs in print controller 102, there may be a need or a desire to purge print data path 130 of its data. To purge print data path 130, new messages are defined in print controller 102. One of the messages is a "flush job" message. The flush job message includes a print job identifier for a specific print job, and instructs a component in print data path 130 to purge data regarding the print job. Another one of the messages is a "flush path" message. The flush path message instructs a component in print data path 130 to purge data for each of the print jobs being presently processed in the component.

Control system 120 is a centralized node in print controller 102 for handling the flush job messages and the flush path messages. Thus, each component in print data path 130 registers with control system 120 indicating whether it requests a flush job message, a flush path message, or both. Some of the components in print data path 130 may operate on a job-level, and it may be more efficient for these components to purge data on a job-by-job basis. These types of components may thus register for flush job messages. It may be more efficient for other components to purge all print job data simultaneously. These types of components may thus register for flush path messages.

Figure 3:
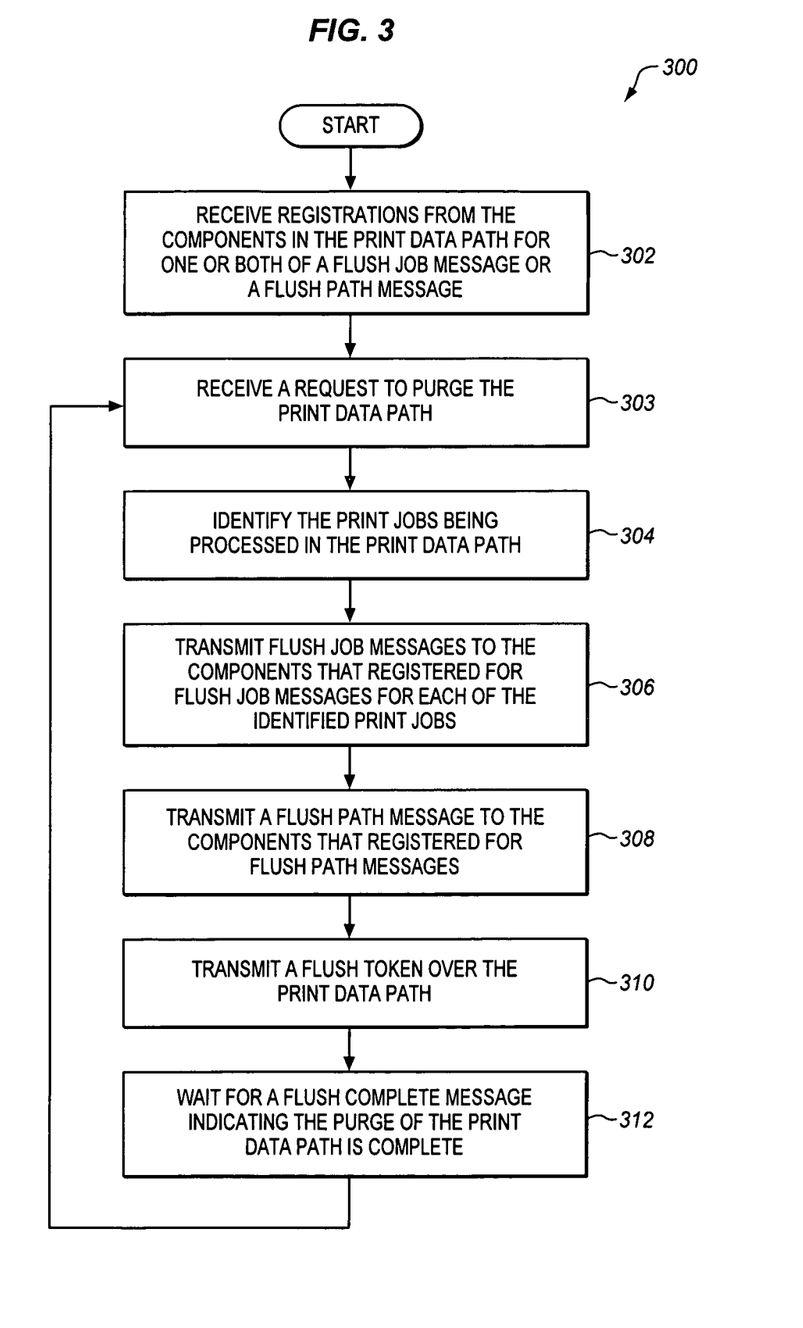
FIG. 3 is a flow chart illustrating a method of operating a control system to purge a print data path in an exemplary embodiment of the invention.

FIG. 3 is a flow chart illustrating a method 300 of operating control system 120 to purge print data path 130 in an exemplary embodiment of the invention. In step 302, control system 120 receives the registrations from the components in print data path 130. For example, control system 120 may receive registrations from components in raw data preprocessing system 114, interpreter system 116, and/or bitmap processing system 118 requesting to receive a flush job message, a flush path message, or both.

In step 303, control system 120 receives a request to purge print data path 130. The request may be from any other device, and may be responsive to a redrive event. In step 304, control system 120 identifies the print jobs being processed in print data path 130. For example, job storage system 112 may maintain a list of the jobs that were released over print data path 130 to raw data preprocessing system 114. Thus, control system 120 may query job storage system 112 to identify the print jobs that are presently being processed in print data path 130.

In step 306, control system 120 transmits flush job messages to the components that registered for the flush job messages. The flush job messages instruct the components to purge data for a particular print job. If multiple print jobs were identified in step 304, then control system 120 transmits the flush job messages for each of the print jobs identified to be in print data path 130.

In step 308, control system 120 transmits the flush path messages to the components that registered for the flush path messages. The flush path messages instruct the components to purge data for the print jobs that they are handling. By "handling" a print job, the component may be processing data for one or more print jobs, queuing data for one or more print jobs, or otherwise using or storing data for one or more print jobs. Thus, the flush path messages essentially instruct the component to purge all data regarding print jobs.

After the flush job messages and the flush path messages have been transmitted, control system 120 transmits a flush token over print data path 130 in step 310. A flush token comprises any code, string of characters, or other data that is transmitted over print data path 130. Because the flush token is transmitted over print data path 130, if all other print data is purged from the print data path 130, the flush token will travel from component to component until it reaches the end of print data path 130. Receipt of the flush token at the end component indicates that print data path 130 has been purged of the data for the print jobs. The flush token also indicates to each component that the purging processes being performed within the component may end. In step 312, control system 120 waits for a flush complete message from the component, which is the end component, indicating that the purge of print data path 130 is complete.

Figure 4:
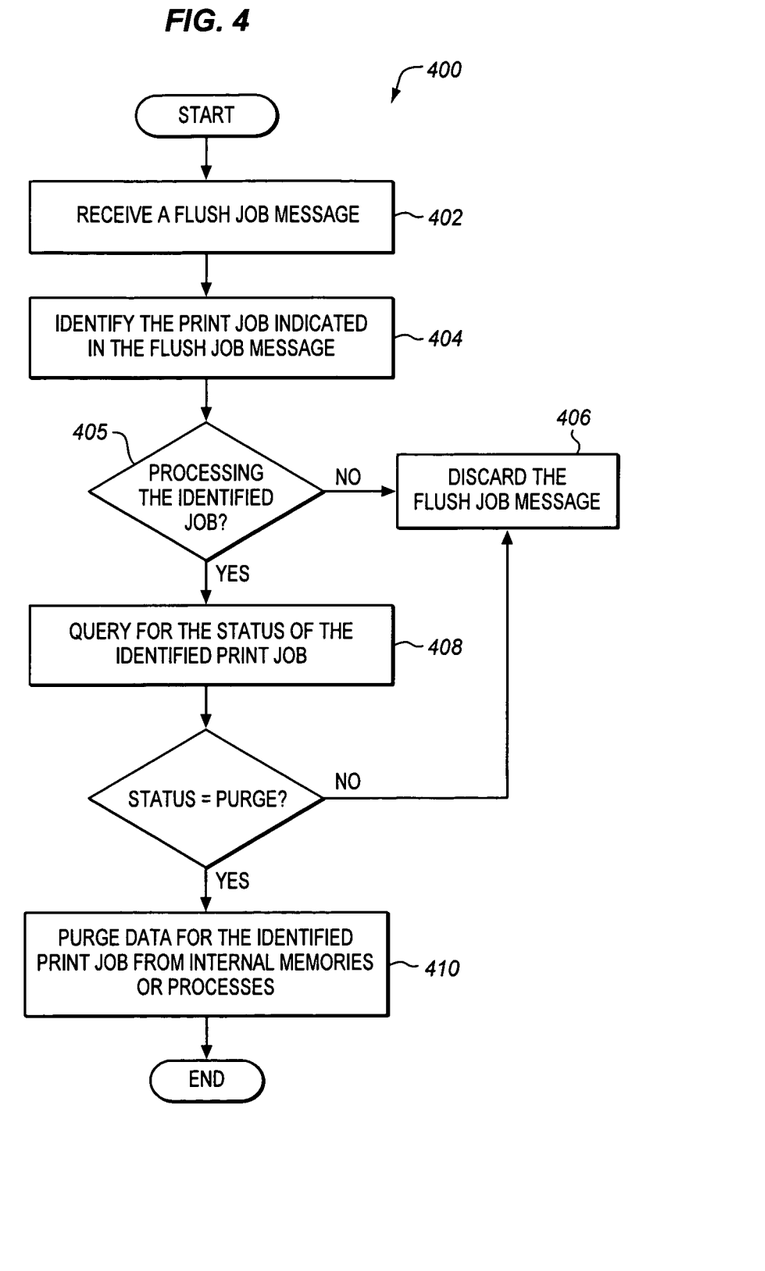
FIG. 4 is a flow chart illustrating a method of handling flush job messages in a component in an exemplary embodiment of the invention.

FIG. 4 is a flow chart illustrating a method 400 of handling flush job messages in a component in an exemplary embodiment of the invention. The component executing method 400 may be any component in print data path 130 that registered for flush job messages. The component may be implemented in raw data preprocessing system 114, interpreter system 116, bitmap processing system 118, or another system.

In step 402, the component receives the flush job message. In step 404, the component identifies the print job indicated in the flush job message. The print job may be indicated by the print job ID that is assigned to the print job and remains unique to the print job throughout processing. The component then determines if it is processing the identified print job in step 405. If the component is not processing the identified print job, then the component discards the flush job message in step 406.

If the component is processing the identified print job, then the component queries control system 120 for the status of the identified print job in step 408. This is done to check whether the job is in a cancel state, for example, which may have different processing defined, and may take precedence over the flush state. If the status is to purge or flush the print job, then the component purges the data for the identified print job from internal memories, processes, or other hardware devices or software applications that store or process data regarding the print job in step 410.

Figure 5:
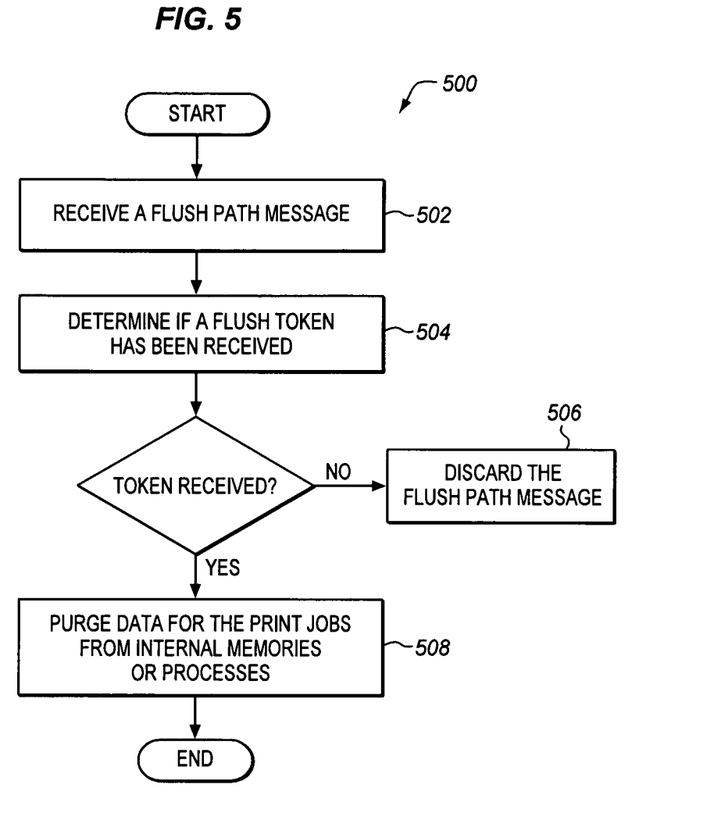
FIG. 5 is a flow chart illustrating a method of handling flush path messages in a component in an exemplary embodiment of the invention.

FIG. 5 is a flow chart illustrating a method 500 of handling flush path messages in a component in an exemplary embodiment of the invention. The component executing method 500 may be any component in print data path 130 that registered for flush path messages. The component may be implemented in raw data preprocessing system 114, interpreter system 116, bitmap processing system 118, or another system.

In step 502, the component receives the flush path message. Due to delays in transmission or other problems, the flush path message may not be received before the flush token. To ensure correct purging of the data for print jobs that are received before the flush token, the component determines whether the flush token has been received in step 504. There may be a variety of ways of determining whether a flush token has been received. In one embodiment, the component maintains an internal counter that is initially set to 0. In response to receiving a flush path message, the counter is incremented by 1. In response to receiving a flush token, the counter is decremented by 1. Thus, to determine whether a flush token has been received, the component determines whether the value of the counter is greater than 0. If the counter is less than or equal to 0, then the flush token was received before the flush path message. If the counter is greater than zero, then the flush path message was received before the flush token.

If the flush token was received before the flush path message, then the component discards the flush path message in step 506. If the flush token was not received before the flush path message, then the component purges the data for each of the print jobs being handled from internal memories, processes, or other hardware devices or software applications that store or process data regarding the print jobs in step 508. The component may continue to purge all print job data until a flush token is received over print data path 130.

Although the above embodiment for purging print data path 130 was illustrated in print controller 102, the concepts described above may be implemented in other types of systems. There may be a need in other systems that have a data path comprised of multiple components operable to process jobs to purge the jobs at some point. The above methods of purging a data path may be used to purge the jobs in virtually any data path using the flush job message and the flush path message.

Figure 6:
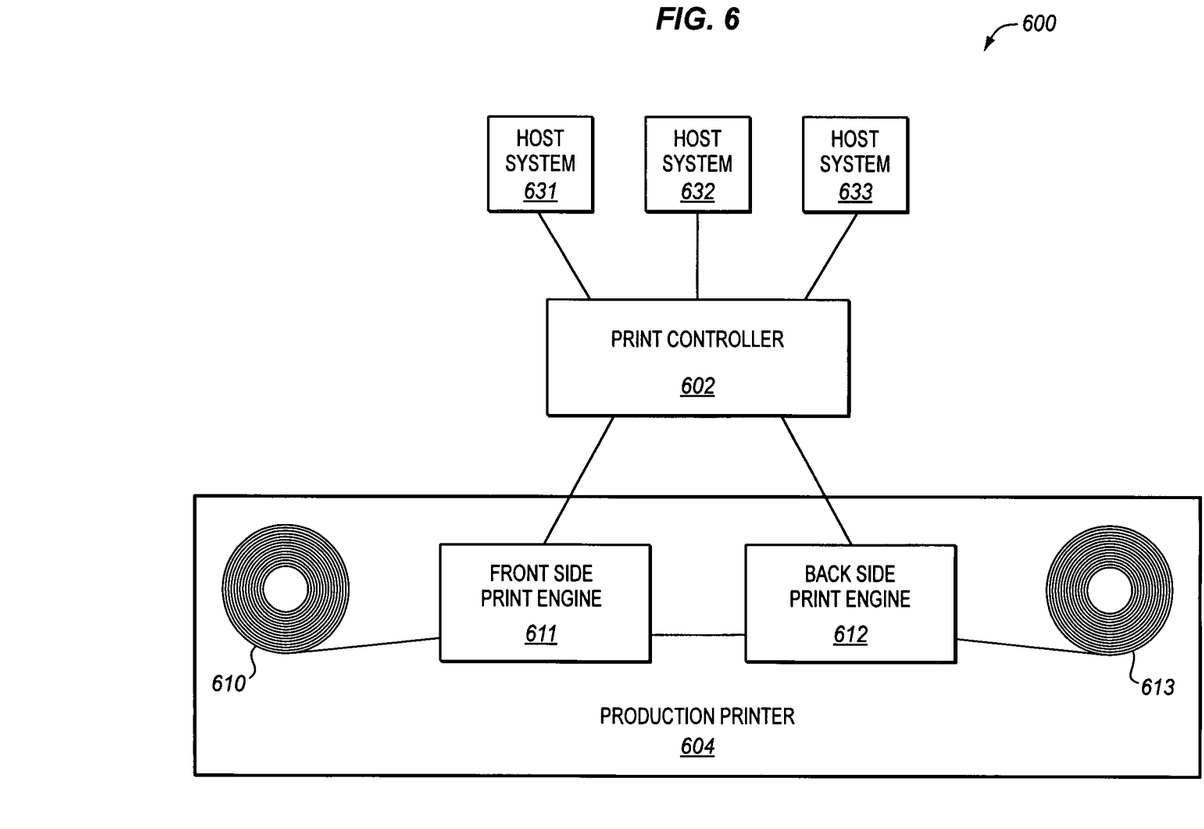
FIG. 6 illustrates a production printing system in an exemplary embodiment of the invention.
Figure 7:
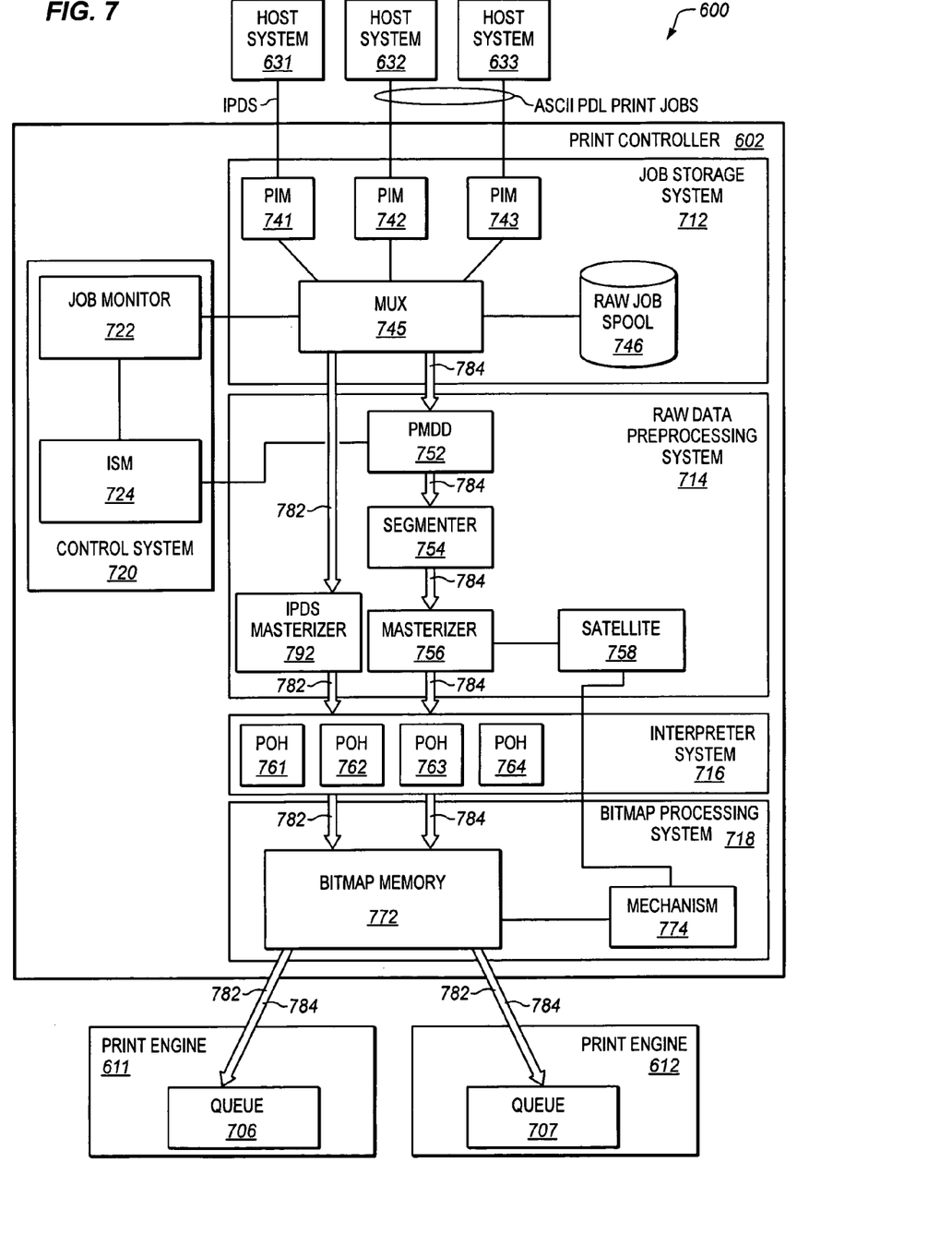
FIG. 7 illustrates a print controller for a production printing system in an exemplary embodiment of the invention.

FIGS. 6-7 and the following description provide a more detailed embodiment of a production printing system 600 and a print controller 602. FIG. 6 illustrates a production printing system 600 in an exemplary embodiment of the invention. Production printing system 600 includes a plurality of host systems 631-633, a print controller 602, and a production printer 604. Production printer 604 in this embodiment comprises a continuous forms printer having an input paper supply 610, a front side print engine 611, a backside print engine 612, and an output paper stack 613. Although a continuous forms printer is illustrated in FIG. 6, the concepts described below also apply to cut sheet production printers.

FIG. 7 illustrates print controller 602 in an exemplary embodiment of the invention. Print controller 602 includes a job storage system 712, a raw data preprocessing system 714, an interpreter system 716, a bitmap processing system 718, and a control system 720. Job storage system 712 includes a plurality of Protocol Interface Modules (PIM) 741-743 that are operable to communicate with host systems 631-633. Host systems 631-633 may use different protocols for submitting print jobs to print controller 602, and PIMs 741-743 are operable to receive the different types of print jobs. Assume for this embodiment that one of the host systems, such as host system 631, submits one or more print jobs using the IPDS protocol. The other hosts systems 632-633 submit print jobs using ASCII PDLs, such as PS, PDF, PCL, PJL, PPML, etc. Job storage system 712 further includes a multiplexer (MUX) 745 and a raw job spool 746. MUX 745 is operable to determine where to route an IPDS data stream or the ASCII PDL print jobs from PIMs 741-743. For instance, IPDS data steams are not stored in raw job spool 746, so MUX 745 forwards the IPDS data stream from PIM 741 to raw data preprocessing system 714. ASCII PDL print jobs are stored in raw job spool 746, so MUX 745 forwards the print jobs from PIMs 742-743 to raw job spool 746. MUX 745 also retrieves the spooled print jobs according to a schedule controlled by a job monitor 722, and forwards the print jobs to raw data preprocessing system 714.

MUX 745 provides two separate print data paths through print controller 602 to print engines 611-612. Print data path 782 represents the data path for an IPDS data stream through an IPDS masterizer module 792 of print controller 602. Print data path 784 represents the data path for ASCII PDL print jobs through other components of print controller 602. Although print controller 602 is described as handling both IPDS data streams and ASCII PDL print jobs in this embodiment, those skilled in the art will appreciate that print controller 602 may handle only ASCII PDL print jobs in other embodiments.

Raw data preprocessing system 714 includes a Post-MUX Data Delivery (PMDD) module 752, a segmenter module 754, a masterizer module 756, and a satellite module 758. The PMDD module 752 is operable to manage copies for the print job(s), such as if multiple copies are to be printed. Segmenter module 754 is operable to segment a print job into individual pages. Masterizer module 756 is operable to create or define sheetsides of the segmented pages. Masterizer module 756 thus includes layout functionalities to construct the sheetsides based on the segmented pages. Satellite module 758 is operable to sequence sheetside bitmaps that will be generated in interpreter system 716. For instance, some of the sheetsides may take longer to render than others, and thus may be finished out of order. Satellite module 758 is operable to determine the correct order of the sheetside bitmaps that are generated by interpreter system 716.

Interpreter system 716 includes a plurality of Page Object Handler (POH) modules 761-764. POH modules 761-764 are operable to render raw sheetsides to generate sheetside bitmaps. Depending on the format of the print jobs, one of the POHs may be a PostScript (PS) interpreter, one may be a PCL interpreter, etc. One or more of the POH modules 761-764 may be operating concurrently on the sheetsides in order to increase the processing speed of print controller 602.

Bitmap processing system 718 includes a bitmap memory 772 and a mechanism module 774. Bitmap memory 772 is operable to receive sheetside bitmaps from interpreter system 716, and to store the sheetside bitmaps for printing. Mechanism module 774 is operable to control the transfer of the sheetside bitmaps from bitmap memory 772 to print engines 611-612. Mechanism module 774 receives pointers or other control data from satellite mechanism 758 is order to control the transfer of the sheetside bitmaps.

Print engines 611-612 each include an internal queue 706-707, respectively. Queues 706-707 are operable to receive and buffer sheetside bitmaps received from bitmap memory 772. Print engine 611 will offload the sheetside bitmaps that are buffered in queue 706, and image the sheetside bitmaps on a front side of the paper. Similarly, print engine 612 will offload the sheetside bitmaps that are buffered in queue 707, and image the sheetside bitmaps on the back side of the paper.

Control system 720 includes a job monitor 722 and an Internal State Manager (ISM) 724. Job monitor 722 is operable to control the processing of print jobs in print controller 602. Job monitor 722 is also operable to provide a user interface, such as a Graphical User Interface (GUI), to allow a printer operator to view and control the print job processing. ISM 724 is operable to detect redrive events in printing system 600, and to initiate recovery processes responsive to redrive events.

When in operation, PIMs 742-743 receive print jobs from host systems 632-633, respectively. The print jobs received are ASCII PDL print jobs. PIMs 742-743 forward the print jobs to MUX 745, which stores the print jobs on raw job spool 746. Job monitor 722 schedules the print jobs that are stored in raw job spool 746, and instructs MUX 745 to retrieve a first one of the print jobs from the raw job spool 746, and forward the raw data for the first print job to raw data preprocessing system 714 (over print data path 784).

PMDD module 752 receives the raw data for the first print job, and determines whether there are multiple copies requested for the first print job. In this embodiment, there is only one copy requested, so PMDD module 752 may perform other preprocessing on the raw data, and then forward the raw data for the first print job to segmenter module 754.

Segmenter module 754 segments the raw data into segmented pages for the first print job. To segment the pages, segmenter module 754 may process the raw data for the first print job to identify a start-of-page identifier and an end-of-page identifier for a first page, then identify a start-of-page identifier and an end-of-page identifier for a second page, etc. Segmenter module 754 then forwards the segmented pages of the first print job to masterizer module 756.

Masterizer module 756 performs layout functionalities to construct raw sheetsides out of the segmented pages of the first print job. For example, if 2-up printing is requested for the first print job, then masterizer module 756 constructs raw sheetsides with two segmented pages on each sheetside. If two sided printing is requested, then masterizer module 756 constructs the front sheetsides and the back sheetsides based on the segmented pages. Masterizer module 756 then forwards the raw sheetsides to interpreter system 716. Satellite module 758 monitors the sequence or order of the raw sheetsides for the first print job, and generates pointers or other control information indicating the proper sequence.

POHs 761-764, or any subset thereof, receive the raw sheetsides from masterizer module 756, and render the raw sheetsides to generate sheetside bitmaps. POHs 761-764 then forward the sheetside bitmaps to bitmap memory 772, which stores the sheetside bitmaps for printing. Mechanism module 774 receives the pointers from satellite module 758, and determines the proper sequence for the sheetside bitmaps. Mechanism module 774 then controls the transfer of the sheetside bitmaps from the bitmap memory 772 to print engines 611-612.

Print engines 611-612 receive the sheetside bitmaps from bitmap memory 772, and store the sheetside bitmaps in queues 706-707, respectively. Each print engine 611-612 then performs an imaging process to mark the paper with the sheetside bitmaps stored in queues 706-707.

Depending on the processing capabilities of print controller 602 and the size of the print jobs, job monitor 722 may schedule a second print job being stored in raw job spool 746 to immediately follow a first print job. If a second print job is scheduled, MUX 745 forwards raw data for the second print job immediately behind the first print job (over print data path 784) to raw data preprocessing system 714. In this way, processing of multiple jobs occurs concurrently through a single print data path 784. Thus, there may be multiple print jobs in print data path 784 that are being simultaneously processed within print controller 602.

At some point during processing of the first print job in print controller 602, assume that a need or desire arises to purge print data path 784. One example of a need to purge print data path 784 is responsive to a redrive event, such as a change to print settings. If ISM 724 detects the redrive event, then it transmits a request to purge print data path 784 to job monitor 722.

Responsive to a request to purge print data path 784, job monitor 722 initiates the steps to purge the print jobs from print data path 784. Before the request was received, each of the components in print data path 784 registered with job monitor 722 indicating whether it requests a flush job message, a flush path message, or both. For example, PMDD module 752, segmenter module 754, masterizer module 756, and other components may each register for a flush job message, a flush path message, or both.

To purge the print jobs, job monitor 722 identifies the print jobs being processed in print data path 784. Job monitor 722 then transmits flush job messages to the components that registered for the flush job messages. If multiple print jobs were identified, then job monitor 722 transmits the flush job messages for each of the print jobs identified to be in print data path 784.

Assume for example that masterizer module 756 registers for a flush job message. Responsive to receiving the flush job message, masterizer module 756 processes the message to identify the print job ID in the message. The print job ID identifies the job to be flushed. Masterizer module 756 then determines if it is processing the identified print job. If it is not processing the identified print job, then masterizer module 756 discards the flush job message. If it is processing the identified print job, then masterizer module 756 queries job monitor 722 for the status of the identified print job. If the status is to purge the print job, then masterizer module 756 purges the data for the identified print job from internal memories, processes, or other hardware devices or software applications that store or process data regarding the print job.

If masterizer module 756 is processing multiple print jobs, then it will receive a flush job message for each of the print jobs that it is processing.

After the flush job messages are sent, job monitor 722 transmits the flush path messages to the components that registered for the flush path messages. Assume for example that PMDD module 752 registers for the flush path message. Responsive to receiving the flush path message, PMDD module 752 increments an internal counter, which is initially set at 0. PMDD module 752 then determines whether the value of the counter is greater than 0. If the counter is less than or equal to 0, then PMDD module 752 discards the flush path message, and does not purge any print job data because a flush token was already received and the print data is not to be purged. If the counter is greater than zero, then PMDD module 752 purges the data for each of the print jobs being handled from internal memories, processes, or other hardware devices or software applications that store or process data regarding the print jobs. PMDD module 752 may continue to purge all print job data until a flush token is received over print data path 784.

After the flush job messages and the flush path messages have been transmitted, job monitor 722 transmits a flush token over print data path 784. Because the flush token is transmitted over print data path 784, if all other print data is purged from the print data path 784, the flush token will travel from component to component until it reaches the end of print data path 784. Receipt of the flush token at the component at the end of print data path 784 indicates that print data path 784 has been purged of the data for the print jobs. Assume for example that masterizer module 756 is the end component in print data path 784. After sending the flush token, job monitor 722 waits for a flush complete message from masterizer module 756. Responsive to receiving the flush token, masterizer module 756 transmits a flush complete message to job monitor 722. This indicates to job monitor 722 that the purge of print data path 784 is complete.

Figure 8:
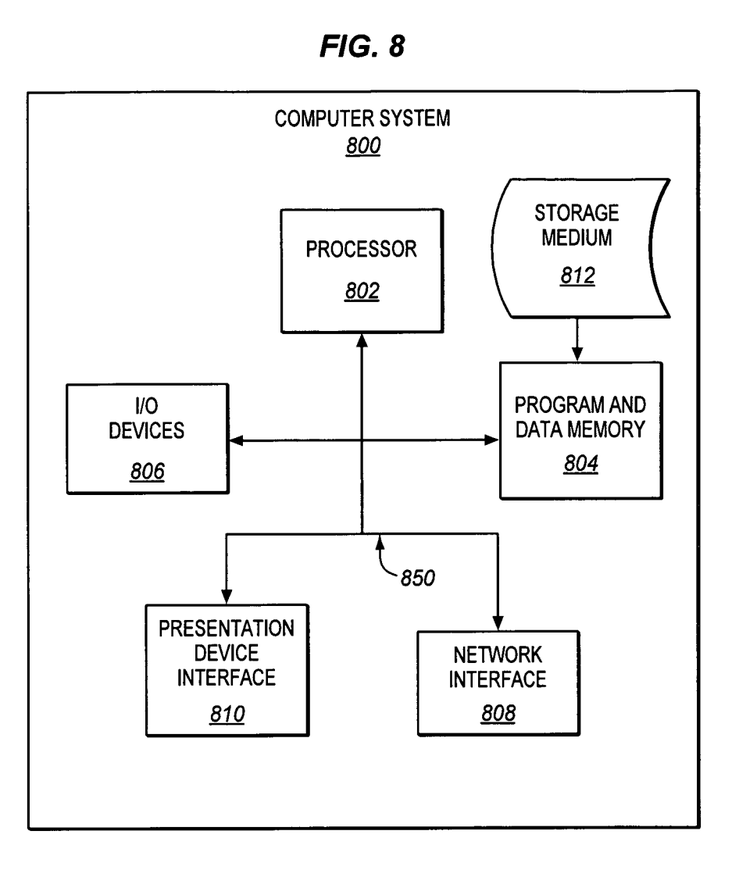
FIG. 8 illustrates a computer system operable to execute computer readable medium embodying programmed instructions to perform desired functions in an exemplary embodiment of the invention.

Embodiments of the invention can take the form of an entirely hardware embodiment, an entirely software embodiment or an embodiment containing both hardware and software elements. In one embodiment, the invention is implemented in software, which includes but is not limited to firmware, resident software, microcode, etc. FIG. 8 is a block diagram depicting a computer system 800 operable to provide features and aspects hereof by executing programmed instructions and accessing data stored on a computer readable storage medium 812.

Furthermore, embodiments of the invention can take the form of a computer program product accessible from a computer-usable or computer-readable medium 812 providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A computer system 800 suitable for storing and/or executing program code will include at least one processor 802 coupled directly or indirectly to memory elements 804 through a system bus 850. The memory elements 804 can include local memory employed during actual execution of the program code, bulk storage, and cache memories which provide temporary storage of at least some program code in order to reduce the number of times code must be retrieved from bulk storage during execution.

Input/output or I/O devices 806 (including but not limited to keyboards, displays, pointing devices, etc) can be coupled to the system either directly or through intervening I/O controllers. Network adapter interfaces 808 may also be coupled to the system to enable the computer system 800 to become coupled to other data processing systems or storage devices through intervening private or public networks. Modems, cable modems, IBM Channel attachments, SCSI, Fibre Channel, and Ethernet cards are just a few of the currently available types of network or host interface adapters. Presentation device interface 810 may be coupled to the system to interface to one or more presentation devices such as printing systems and displays for presentation of presentation data generated by processor 802.

Although specific embodiments were described herein, the scope of the invention is not limited to those specific embodiments. The scope of the invention is defined by the following claims and any equivalents thereof.

We claim:

1. A print controller for a production printing system, the print controller comprising:
    a job storage system operable to receive print jobs from at least one host system, and to store the print jobs;
    a print data path from the job storage system to at least one print engine of the production printing system, the print data path includes components operable to process print jobs for imaging on the at least one print engine; and
    a control system operable to receive registrations from the components in the print data path for at least one of flush job messages or flush path messages, to receive a request to purge the print data path, to identify the print jobs being processed in the print data path, to transmit flush job messages to the components registering for the flush job messages for each of the identified print jobs in the print data path, wherein the flush job messages instruct the components to purge data for the identified print jobs, and to transmit a flush path message to the components registering for the flush path messages instructing the components to purge data for each of the print jobs being handled;
    wherein the control system is further operable to transmit a flush token over the print data path; and
    wait for a flush complete message from a component at the end of the print data path indicating that the purging of the print data path is complete.

2. The print controller of claim 1 wherein the components in the print data path that receive a flush job message are each operable to:
    identify a print job indicated in the flush job message; and
    purge data for the identified print job from internal memories or processes.

3. The print controller of claim 1 wherein the components in the print data path that receive a flush path message are each operable to:
    purge data for each of the print jobs being handled from internal memories or processes responsive to receiving the flush path message.

4. The print controller of claim 1 wherein the request is received responsive to a redrive event.

5. The print controller of claim 4 wherein the redrive event comprises a change to print settings on the production printing system or a hardware error in the production printing system.

6. A method of purging print jobs from a print data path in a print controller of a production printing system, wherein the print controller includes a job storage system that receives and stores print jobs from at least one host system, and includes the print data path from the job storage system to at least one print engine of the production printing system, wherein the print data path includes at least one component operable to process print jobs for imaging on the at least one print engine, the method comprising:
   receiving registrations from the components in the print data path for at least one of flush job messages or flush path messages;
   receiving a request to purge the print data path;
   identifying the print jobs being processed in the print data path;
   transmitting flush job messages to the components registering for the flush job messages for each of the identified print jobs in the print data path, wherein the flush job messages instruct the components to purge data for the identified print jobs;
   transmitting a flush path message to the components registering for the flush path messages instructing the components to purge data for each of the print jobs being handled;
   transmitting a flush token over the print data path; and
   waiting for a flush complete message from a component at the end of the print data path indicating that the purging of the print data path is complete.

7. The method of claim 6 further comprising:
   identifying, in a component receiving the flush job message, a print job indicated in the flush job message; and
   purging data for the identified print job from internal memories or processes.

8. The method of claim 6 further comprising:
   purging, in a component receiving the flush path message, data for each of the print jobs being handled from internal memories or processes.

9. The method of claim 6 wherein receiving a request to purge the print data path comprises:
   receiving the request to purge the print data path responsive to a redrive event.

10. The method of claim 9 wherein the redrive event comprises a change to print settings on the production printing system or a hardware error in the production printing system.

11. A non-transitory computer readable medium tangibly embodying programmed
   instructions which, when executed by a computer system, are operable to execute a method of purging print jobs from a print data path in a print controller of a production printing system, wherein the print controller includes a job storage system that receives and stores print jobs from at least one host system, and includes the print data path from the job storage system to at least one print engine of the production printing system, wherein the print data path includes at least one component operable to process print jobs for imaging on the at least one print engine, the method comprising:
   receiving registrations from the components in the print data path for at least one of flush job messages or flush path messages;
   receiving a request to purge the print data path;
   identifying the print jobs being processed in the print data path;
   transmitting flush job messages to the components registering for the flush job messages for each of the identified print jobs in the print data path, wherein the flush job messages instruct the components to purge data for the identified print jobs;
   transmitting a flush path message to the components registering for the flush path messages instructing the components to purge data for each of the print jobs being handled;
   transmitting a flush token over the print data path; and
   waiting for a flush complete message from a component at the end of the print data path indicating that the purging of the print data path is complete.

12. The computer readable medium of claim 11 wherein the method further comprises:
   identifying, in a component receiving the flush job message, a print job indicated in the flush job message; and
   purging data for the identified print job from internal memories or processes.

13. The computer readable medium of claim 11 wherein the method further comprises:
   purging, in a component receiving the flush path message, data for each of the print jobs being handled from internal memories or processes.

14. The computer readable medium of claim 11 wherein receiving a request to purge the print data path comprises:
   receiving the request to purge the print data path responsive to a redrive event.

15. The computer readable medium of claim 14 wherein the redrive event comprises a change to print settings on the production printing system or a hardware error in the production printing system.

16. A print controller for a production printing system, the print controller comprising:
   a job storage system operable to receive print jobs from at least one host system, and to store the print jobs;
   a print data path from the job storage system to at least one print engine of the production printing system, the print data path comprising at least the following components:
   a raw data preprocessing system operable to receive raw data for a print job from the job storage system, to segment the raw data of the print job into segmented pages, and to define raw sheetsides based on the segmented pages;
   an interpreter system operable to receive the raw sheetsides from the raw data preprocessing system, and to render the raw sheetsides to generate sheetside bitmaps;
   and a bitmap processing system operable to receive the sheetside bitmaps from the interpreter system, and to forward the sheetside bitmaps to the at least one print engine;
   and a control system operable to receive registrations from the components in the print data path for at least one of flush job messages or flush path messages, to receive a request to purge the print data path, to identify the print jobs being processed in the print data path, to transmit flush job messages to the components registering for the flush job messages for each of the identified print jobs in the print data path, wherein the flush job messages instruct the components to purge data for the identified print jobs, and to transmit a flush path message to the components registering for the flush path messages instructing the components to purge data for each of the print jobs being handled;
   wherein the control system is further operable to:
   transmit a flush token over the print data path; and wait for a flush complete message from a component at the end of the print data path indicating that the purging of the print data path is complete.

17. The print controller of claim 16 wherein the components in the print data path that receive a flush job message are each operable to:
    identify a print job indicated in the print job message responsive to receiving the flush job message; and
    purge data for the identified print job from internal memories or processes.

18. The print controller of claim 16 wherein the components in the print data path that receive a flush path message are each operable to:
    purge data for each of the print jobs being handled from internal memories or processes responsive to receiving the flush path message.

19. The print controller of claim 16 wherein the request is received responsive to a redrive event.

20. The print controller of claim 19 wherein the redrive event comprises a change to print settings on the production printing system or a hardware error in the production printing system.

21. The print controller of claim 16 wherein the production printing system comprises a continuous forms printing system or a cut sheet printing system.

22. The print controller of claim 16 wherein the job storage system comprises:
    a raw job spool operable to store print jobs;
    a plurality of Protocol Interface Modules (PIM) operable to receive print jobs from the at least one host system; and
    a multiplexer (MUX) operable to route the print jobs received in the PIMs to the raw job spool, and to retrieve the print jobs from the raw job spool according to a schedule.

23. The print controller of claim 22 wherein the raw data preprocessing system comprises:
    a Post-MUX Data Delivery (PMDD) module operable to receive the raw data for the print job from the job storage system;
    a segmenter module operable to segment the raw data of the print job into the segmented pages;
    a masterizer module operable to define the sheetsides based on the segmented pages; and
    a satellite module operable to sequence the sheetside bitmaps generated in the interpreter system.

24. The print controller of claim 23 wherein the interpreter system comprises:
    a plurality of Page Object Handler (POH) modules operable to render the raw sheetsides to generate the sheetside bitmaps.

25. The print controller of claim 24 wherein the bitmap processing system comprises:
    a bitmap memory operable to receive the sheetside bitmaps from the interpreter system, and to store the sheetside bitmaps for printing; and
    a mechanism module operable to control the transfer of the sheetside bitmaps from the bitmap memory to the at least one print engine.

26. The print controller of claim 25 wherein the control system comprises:
    a job monitor operable to control the processing of the print jobs in the print controller; and
    an Internal State Manager (ISM) operable to detect a redrive event, and to request a purge of the print data path responsive to the redrive event.

* * * * *